(12) United States Patent
Winner et al.

(10) Patent No.: US 6,653,935 B1
(45) Date of Patent: Nov. 25, 2003

(54) METHOD FOR EVALUATING OBJECTS IN THE PATH OF A VEHICLE

(75) Inventors: Hermann Winner, Karlsruhe (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 09/709,773

(22) Filed: Nov. 10, 2000

(30) Foreign Application Priority Data

Nov. 12, 1999 (DE) .......................................... 199 54 536

(51) Int. Cl.[7] .................................................. B60Q 1/00
(52) U.S. Cl. ........................ 340/435; 340/436; 340/438; 340/901; 340/903; 340/905; 340/937; 701/96; 701/93; 701/36; 701/41
(58) Field of Search ................................ 340/435, 436, 340/438, 901, 903, 905, 937; 701/96, 93, 36, 41

(56) References Cited

U.S. PATENT DOCUMENTS

| 5,761,629 | A | * | 6/1998 | Gilling | ........................ 701/96 |
|---|---|---|---|---|---|
| 5,964,822 | A | * | 10/1999 | Alland et al. | ................ 701/301 |
| 6,081,762 | A | * | 6/2000 | Richardson et al. | ........... 701/93 |
| 6,116,369 | A | * | 9/2000 | King et al. | ................... 180/169 |
| 6,301,542 | B1 | * | 10/2001 | Kirchberger et al. | .......... 701/93 |
| 6,311,120 | B1 | * | 10/2001 | Asada | .......................... 701/96 |

FOREIGN PATENT DOCUMENTS

DE      42 42 700      6/1994

* cited by examiner

*Primary Examiner*—Daniel J. Wu
*Assistant Examiner*—Tai T. Nguyen
(74) *Attorney, Agent, or Firm*—Kenyon & Kenyon

(57) ABSTRACT

A method for evaluating objects in the path of a vehicle, in which a sensor is used to detect the distance ($d_{zo}$, $d_{zi}$) and/or the speed of the target objects (Zo, Zi). In the presence of more than one target object (Zo, Zi), only the target object (Zi) that is in an area limited by at least one parameter defined by the position relative to the vehicle (F), is included in the evaluation as a new target object (Zo), instead of the current one. The following parameters can be included as conditions for selecting a new target object: $d_{zi} \leq \text{MAX}(d_{min}, d_{zo}+d_0, \alpha^* d_{zo})$.

2 Claims, 1 Drawing Sheet

METHOD FOR EVALUATING OBJECTS IN THE PATH OF A VEHICLE

BACKGROUND INFORMATION

A radar sensor mounted on a vehicle for detecting objects located or moving ahead is known, for example, from German Patent Application No. 42 42 700. This radar sensor may be, for example, a component of an adaptive cruise control (ACC) which continuously processes information about the distance and velocity of the vehicle relative to other vehicles and to the road conditions. This arrangement can enhance a cruise control, which is also known, by adapting the driving speed to slower vehicles moving ahead, when the latter are detected by the radar sensor, and if they are located in the anticipated path area of the vehicle. The path area can be determined, for example, with the help of yaw-rate sensors, steering-angle sensors, and cross-acceleration sensors, wheel speeds, and video sensors or navigation systems.

When using the known system, the closest vehicle in the anticipated path area is frequently selected. The speed and distance data of the vehicle selected in this manner is then forwarded to the control system, which, on the basis of this single object, calculates setpoint quantities that can subsequently be used to generate actuating signals for an engine power controller and/or for brake intervention. Although the closest object in the vehicle's own traffic lane is often indeed the desired target object, situations can arise in which the desired target object is not the one located the shortest distance away. Thus, a single vehicle moving ahead is not the only choice for a potential target object.

Conflicts can arise in the known control system, particularly when the closest current target vehicle passes a vehicle ahead of it that is moving more slowly, and the controlled vehicle will not be following the passing vehicle directly. In this case, the current target object generally speeds up, causing the controlled vehicle to initially also accelerate, only to slow down again later on when the passing vehicle reaches the same level as the new target vehicle.

A method and a device for controlling the speed of a vehicle, where the vehicle for which the minimum setpoint acceleration was calculated is selected as the potential target object, is known from German Patent Application No. 196 37 245. However, this method has a disadvantage in that the vehicle to be controlled is set very early to a distant object, even though a much closer target object is located in the vehicle's own lane, due to lane assignment errors or a varying selection of the controlled vehicle's own lane.

SUMMARY OF THE INVENTION

A method for evaluating objects in the path of a vehicle, where a sensor, for example a radar sensor, is used to determine the distance and/or velocity of the target object, is enhanced according to the present invention in that, when more than one target object is present, only the target object that is located within an area limited by at least one parameter defined by the position relative to the vehicle is included in the evaluation as a new target object, instead of the current one.

One particular advantage of the method according to the present invention is that potential target objects are included in the control system evaluation for the controlled vehicle, e.g., for calculating the vehicle setpoint acceleration, only if this target object lies within a certain distance range. This can largely avoid the disadvantages mentioned above. It is therefore possible to take into account multiple target objects within a limited distance range, which is defined by the current target object. Within this distance range, an early response thus takes place to vehicles moving farther ahead, if they decelerate more sharply or are moving more slowly than the current target object. By limiting the evaluation of the target objects in this manner, only a minor disturbing effect is produced by other objects that are far away from the current target object.

The distance range can be defined, with respect to distance $d_{zo}$ of current target object Zo in a fixed or variable ratio, using equation $\alpha^* d_{zo}$, where $\alpha \geq 1$. Alternatively or additionally, distance $d_{zo}$ can also be limited to a minimum distance $d_{min}$. Furthermore, it is possible to advantageously define a constant or variable distance offset $d_o$, which can be alternatively or additionally included in the distance range definition in the form of a parameter.

On the whole, the condition for taking into account an object Zi at distance $d_{zi}$ when selecting a target object can be defined according to the following equation:

$$d_{zi} \leq \text{MAX} (d_{min}, d_{zo}+d_0, \alpha^* d_{zo})$$

This equation can further include other additional conditions, or it can be reduced to one or two expressions in brackets, as illustrated above. The following values can be assumed for the parameters, for example when using the present invention in a motor vehicle adaptive cruise control system: $d_{min}$=50 m, $\alpha$=1.5, $d_o$=20 m.

According to the present invention, good results can be achieved even by selecting the constant values indicated above for the parameters, at the same time largely avoiding the assignment errors. An advantageous embodiment of the present invention makes it possible to easily adapt at least one of the parameters to the current situation during evaluation of the target objects, by taking into account at least one further measured value. The absolute value of the lateral deviation of the current target object from a precalculated path line or path range can be advantageously used as a further measured value.

This further refinement of the method according to the present invention thus involves adapting and varying one or more of the parameters mentioned above. For example, the distance range being taken into account can be increased when the lateral deviation, referred to here as ZoDyc, of the current target object from a path center increases by an excessive amount. This occurs, for example, in the passing scenario described above, or when the vehicle to be controlled changes lanes.

An equation to be applied in this case can have the following condition for distance offset $d_o$:

$$d_0 = d_{0min} + \beta + |\text{ZoDyc}|,$$

where $\beta$ is an application constant or the result of a possible further adaptation based on a measured value or a known quantity, e.g., as a function of an estimated or detected traffic lane width. The distance range for possible new target objects is thus smaller when the lateral position of the current target object deviates only slightly from the predicted path, and is larger if the target object deviates significantly from its own path. However, the absence of a target object does not limit the range for potential new target objects.

According to a further embodiment of the method according to the present invention, the fact that the traffic lane for the vehicle to be controlled and the target objects has a curved shape, and thus all target objects have a lateral offset in relation to the vehicle, can also be taken into account. We therefore suggest that the absolute value of the lateral deviation of the current target object, referred to here as ZoDyc, be included, if the latter is greater than the absolute value of the lateral deviation of the next target object, referred to here as ZiDyc, and the closest target object is located farther away from the vehicle to be controlled than the current target object.

This condition can be defined as follows:

$$|ZiDyc\ (d_{zi}>d_z)|<|ZoDyc|.$$

DETAILED DESCRIPTION

Figure 1:
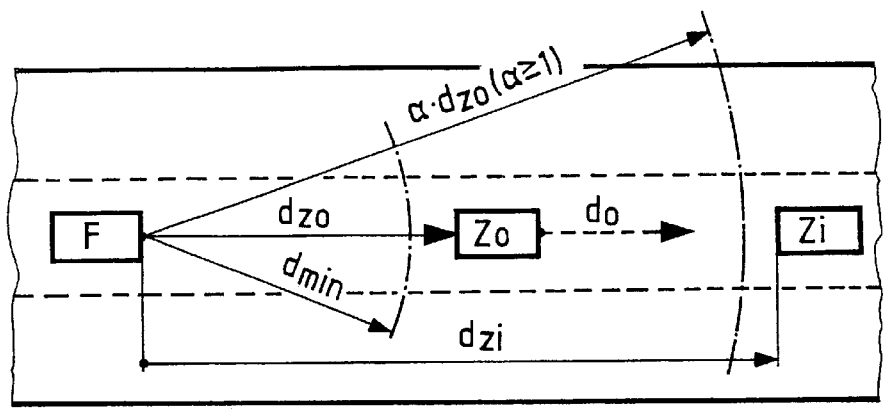
FIG. 1 shows a sketch of a vehicle, in front of which multiple target objects are moving in the same traffic lane.

FIG. 1 shows a schematic sketch of a three-lane roadway on which is located a vehicle F having a control system with an electronic sensor that forms part, for example, of a motor vehicle adaptive cruise control (ACC) with a radar sensor that is known per se from German Patent Application No. 42 42 700 and is mentioned above.

A current target object Zo, to whose speed the control system of vehicle F adapts, is moving ahead of vehicle F at a distance $d_{zo}$, since this target object is the closest vehicle in the anticipated path area. The velocity and distance data of this vehicle (current target object Zo) is then forwarded to the control system, which calculates, in the manner described above, the setpoint quantities that can be used to subsequently generate actuating signals for the engine power controller and/or for brake intervention.

A potential target object Zi is also present in the form of a vehicle moving ahead in the same traffic lane at a greater distance $d_{zi}$. To select target objects Zo, Zi in the manner necessary for certain traffic situations, a distance range is defined with respect to distance $d_{zo}$ of current target object Zo in a fixed or variable ratio, using equation $\alpha*d_{zo}$, where $\alpha \geq 1$. Alternatively or additionally, distance $d_{zo}$ can also be limited to a minimum distance $d_{min}$. Furthermore, a constant or variable distance offset $d_o$, which is alternatively or additionally included in the definition of the distance range in the form of a parameter, can also be advantageously defined.

Figure 2:
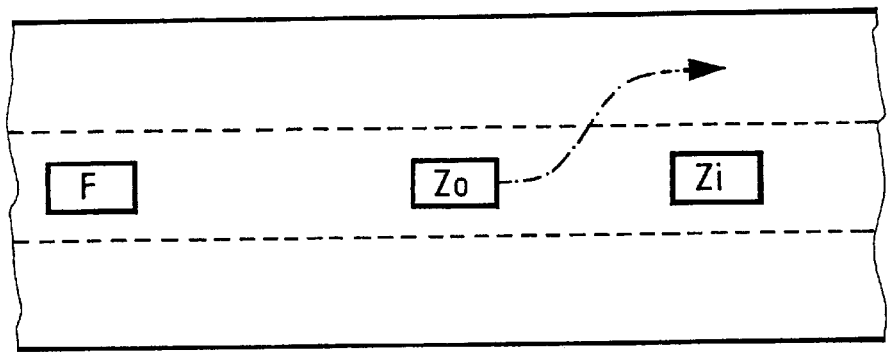
FIG. 2 shows a sketch of a vehicle, in front of which a passing target object is moving.

When using an adaptive cruise control system in the usual manner, situations can arise in which the desired target object is not the one located the shortest distance away. Conflicts can arise, particularly when the current vehicle, defined as target object Zo, passes a target object Zi moving ahead of it at a slower speed, and the controlled vehicle should not be following passing vehicle Zo directly, as shown in FIG. 2. The conditions for taking into account an object Zi when selecting a new target object can be expressed by the following equation in the traffic situation illustrated in FIG. 2:

$$d_{zi} \geq MAX\ (d_{min},\ d_{zo}+d_0,\alpha*d_{zo}),$$

where $d_{min}$=50 m, a=1.5, $d_0$=20 m can be the values in a realistic traffic situation.

In the illustrated traffic situations, the lateral deviation can also be taken into account if the deviation of current target object Zo from a path center increases by an excessive amount. A situation of this type arises in the passing scenario shown in FIG. 2, or in a situation where vehicle F to be controlled changes lanes. An equation to be used in this situation can have the following condition for distance offset do:

$$d_0=d_{0min}+\beta+|ZoDyc|,$$

where β is the result of a possible further adaptation, e.g., as a function of an estimated or detected traffic lane width.

Figure 3:
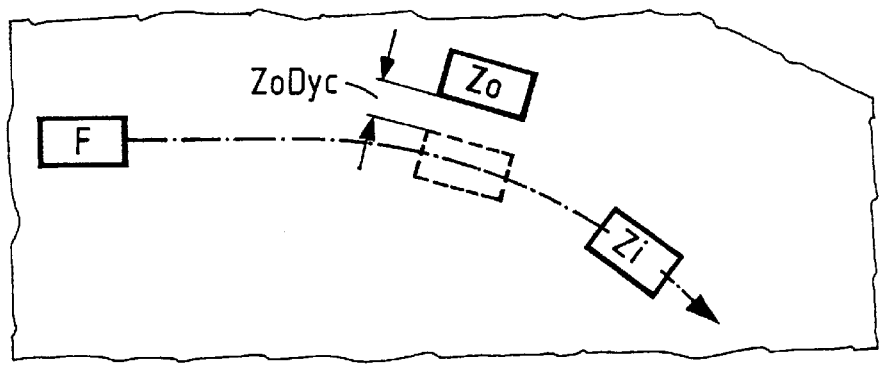
FIG. 3 shows a sketch of a vehicle, in front of which a passing target object is moving in a curved path.

FIG. 3 shows a traffic situation in which the roadway for vehicle F to be controlled and for target objects Zo, Zi is curved, and target objects Zo, Zi thus have a lateral offset in relation to vehicle F. The absolute value of lateral deviation ZoDyc of the current target object is taken into account under the condition that this amount is greater than absolute value ZiDyc for the lateral deviation of closest target object Zi, and closest target object Zi is at a greater distance $d_{zi}$ from vehicle F to be controlled than current target object Zo.

This condition can therefore be defined as follows:

$$|Zidyc\ (d_{zi}>d_z)|<|zodyc|$$

What is claimed is:

1. A method for evaluating objects in the path of a vehicle, comprising the steps of:

detecting at least one of a distance and a relative velocity of at least one object relative to the vehicle using a sensor;

determining a current target distance between the vehicle and a current target object;

if more than one object is detected, evaluating each object located within an area defined based upon at least one parameter related to the current target distance, as a possible new target object;

using as a farther measured value an amount of a lateral deviation of a current target object from one of a precalculated path line and a path range; and taking into account, in the evaluation, an absolute value of the lateral deviation of the current target object if the absolute value of the lateral deviation of the current target object is greater than an absolute value of a lateral deviation of a closest target object, and the closest target object is located at a greater distance from the vehicle than the current target object.

2. A method for evaluating objects in the path of a vehicle, comprising the steps of:

detecting at least one of a distance and a relative velocity of at least one target object using a sensor, wherein, in the presence of more than one target object, only a target object that is located in an area limited by at least one parameter defined by a position relative to the vehicle is included in an evaluation as a possible new target object, instead of a current one;

using as a further measured value an amount of a lateral deviation of a current target object from one of a precalculated path line and a path range; and taking into account, in the evaluation, an absolute value of the lateral deviation of the current target object if the absolute value of the lateral deviation of the current target object is greater than an absolute value of a lateral deviation of a closest target object, and the closest target object is located at a greater distance from the vehicle than the current target object.

* * * * *